United States Patent
Cunha et al.

(10) Patent No.: US 10,697,636 B2
(45) Date of Patent: Jun. 30, 2020

(54) COOLING A COMBUSTOR HEAT SHIELD PROXIMATE A QUENCH APERTURE

(71) Applicant: United Technologies Corporation, Farmington, CT (US)

(72) Inventors: Frank J. Cunha, Avon, CT (US); Stanislav Kostka, Jr., Northbridge, MA (US); Randal G. McKinney, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 591 days.

(21) Appl. No.: 15/100,374

(22) PCT Filed: Dec. 4, 2014

(86) PCT No.: PCT/US2014/068602
§ 371 (c)(1),
(2) Date: May 31, 2016

(87) PCT Pub. No.: WO2015/085081
PCT Pub. Date: Jun. 11, 2015

(65) Prior Publication Data
US 2016/0298843 A1 Oct. 13, 2016

Related U.S. Application Data

(60) Provisional application No. 61/912,976, filed on Dec. 6, 2013.

(51) Int. Cl.
*F23R 3/06* (2006.01)
*F02C 3/04* (2006.01)
*F23R 3/00* (2006.01)

(52) U.S. Cl.
CPC .............. *F23R 3/06* (2013.01); *F02C 3/04* (2013.01); *F23R 3/002* (2013.01); *F05D 2220/32* (2013.01); *F23R 2900/03041* (2013.01); *F23R 2900/03042* (2013.01); *F23R 2900/03044* (2013.01)

(58) Field of Classification Search
CPC .. F23R 3/06; F23R 3/002; F23R 2900/03041; F23R 2900/03042; F23R 2900/03044; F02C 3/04; F05D 2220/32
See application file for complete search history.

(56) References Cited

U.S. PATENT DOCUMENTS 4,265,085 A   5/1981  Fox et al.
4,695,247 A   9/1987  Enzaki et al.
(Continued)

FOREIGN PATENT DOCUMENTS

JP   63015011      1/1988
JP   2004156860 A  6/2004

OTHER PUBLICATIONS

EP search report for EP14867256.1 dated Dec. 9, 2016.

*Primary Examiner* — Carlos A Rivera
(74) *Attorney, Agent, or Firm* — Getz Balich LLC (57) ABSTRACT

An assembly is provided for a turbine engine. A combustor wall of the turbine engine assembly includes a shell and a heat shield. The combustor wall defines a quench aperture through the shell and the heat shield. The heat shield defines an effusion outlet a distance from the quench aperture equal to between about twenty-five times and about seventy-five times a width of the effusion outlet.

10 Claims, 11 Drawing Sheets

(56) References Cited

U.S. PATENT DOCUMENTS

| | | | |
|---|---|---|---|
| 5,241,827 A * | 9/1993 | Lampes | F01D 5/184 |
| | | | 60/754 |
| 5,461,866 A | 10/1995 | Sullivan et al. | |
| 5,758,503 A | 6/1998 | DuBell et al. | |
| 6,145,319 A * | 11/2000 | Burns | F23R 3/002 |
| | | | 60/754 |
| 6,205,789 B1 * | 3/2001 | Patterson | F23R 3/002 |
| | | | 60/754 |
| 6,408,629 B1 * | 6/2002 | Harris | F23R 3/06 |
| | | | 60/754 |
| 6,513,331 B1 * | 2/2003 | Brown | F23R 3/06 |
| | | | 60/754 |
| 7,093,441 B2 | 8/2006 | Burd et al. | |
| 7,146,815 B2 | 12/2006 | Burd | |
| 7,546,737 B2 * | 6/2009 | Schumacher | F23R 3/002 |
| | | | 60/754 |
| 7,614,235 B2 * | 11/2009 | Burd | F23R 3/002 |
| | | | 60/752 |
| 8,443,610 B2 | 5/2013 | Hoke et al. | |
| 2009/0084110 A1 * | 4/2009 | Dudebout | F23R 3/06 |
| | | | 60/754 |
| 2010/0122537 A1 | 5/2010 | Yankowich et al. | |
| 2010/0287941 A1 | 11/2010 | Kim et al. | |
| 2011/0016874 A1 | 1/2011 | Chandler et al. | |
| 2011/0023495 A1 | 2/2011 | Bronson et al. | |
| 2011/0048024 A1 * | 3/2011 | Snyder | F23R 3/06 |
| | | | 60/754 |
| 2011/0185735 A1 | 8/2011 | Snyder | |
| 2017/0009988 A1 * | 1/2017 | Cunha | F23R 3/002 |

* cited by examiner

COOLING A COMBUSTOR HEAT SHIELD PROXIMATE A QUENCH APERTURE

This application claims priority to PCT Patent Application No. PCT/US14/068602 filed Dec. 4, 2014 which claims priority to U.S. Patent Application No. 61/912,976 filed Dec. 6, 2013, which are hereby incorporated herein by reference in their entireties.

BACKGROUND OF THE INVENTION

1. Technical Field

This disclosure relates generally to a turbine engine and, more particularly, to a combustor of a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall includes a shell and a heat shield, which defines a respective radial side of a combustion chamber. Cooling cavities extend radially between the heat shield and the shell. These cooling cavities fluidly couple impingement apertures defined in the shell with effusion apertures defined in the heat shield.

Each combustor wall may also include a plurality of quench aperture grommets located between the shell and the heat shield. Each of the quench aperture grommets defines a respective quench aperture radially through the combustor wall. The quench aperture grommets as well as adjacent portions of the heat shield are typically subject to relatively high temperatures during turbine engine operation, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. A combustor wall of the turbine engine assembly includes a shell and a heat shield. The combustor wall defines a quench aperture through the shell and the heat shield. The heat shield defines an effusion outlet a distance from the quench aperture equal to between about twenty-five times and about seventy-five times a width of the effusion outlet.

According to another aspect of the invention, an assembly is provided for a turbine engine. A combustor wall of the turbine engine assembly includes a shell and a heat shield. The combustor wall defines a quench aperture vertically through the shell and the heat shield. The heat shield defines a slot outlet through which air effuses and forms an air blanket against the heat shield that flows along a longitudinal path towards the quench aperture.

According to another aspect of the invention, an assembly is provided for a turbine engine. A combustor wall of the turbine engine assembly includes a shell and a heat shield. The combustor wall defines first and second quench apertures vertically through the shell and the heat shield. The heat shield defines laterally adjacent first and second effusion outlets through which air effuses and forms air blankets against the heat shield that respectively flow along longitudinal paths towards the first and the second quench apertures. The first effusion outlet includes a plurality of cooling holes. A lateral distance between an adjacent pair of the cooling holes is less than a lateral distance between the first and the second effusion outlets.

A lateral width of the slot outlet is at least about twenty-five percent of a lateral width of the quench aperture.

A longitudinal distance from the slot outlet to the quench aperture may be equal to between about twenty-five times and about seventy-five times a longitudinal width of the slot outlet.

A longitudinal distance from the first effusion outlet to the first quench aperture may be equal to between about twenty-five times and about seventy-five times a longitudinal width of the first effusion outlet.

The effusion outlet may include a longitudinally extending minor axis and a laterally extending major axis.

The distance may be a longitudinal distance measured between a lateral centroid of the effusion outlet and a lateral centroid of an upstream edge of a surface defining the quench aperture in the heat shield.

The distance may be a longitudinal distance and the shortest distance between the effusion outlet and the quench aperture.

The effusion outlet may include a slot outlet of a cooling slot defined in the heat shield.

The width may be a longitudinal width and may be a minor axis width of the slot outlet.

The effusion outlet may include a plurality of hole outlets of respective cooling holes defined in the heat shield.

The width may be a longitudinal width and may be a diameter of one of the hole outlets.

A portion of the heat shield extending between the effusion outlet and the quench aperture may be non-perforated.

The heat shield may define a second effusion outlet through with the effusion outlet between the second effusion outlet and the quench aperture.

The second effusion outlet may be laterally offset from the effusion outlet.

A distance from the second effusion outlet to the effusion outlet may be equal to between about twenty-five times and about seventy-five times a width of the second effusion outlet.

A portion of the heat shield extending between the second effusion outlet and the effusion outlet may be non-perforated.

The combustor wall may define a second quench aperture through the shell and the heat shield. The heat shield may define a second effusion outlet configured to effuse and direct air toward the second quench aperture. A portion of the heat shield extending between the effusion outlet and the second effusion outlet may be non-perforated.

The effusion outlet may be recessed from a surface of the heat shield opposite a cooling cavity defined between the shell and the heat shield.

The foregoing features and the operation of the invention will become more apparent in light of the following description and the accompanying drawings.

DETAILED DESCRIPTION OF THE INVENTION

Figure 1:
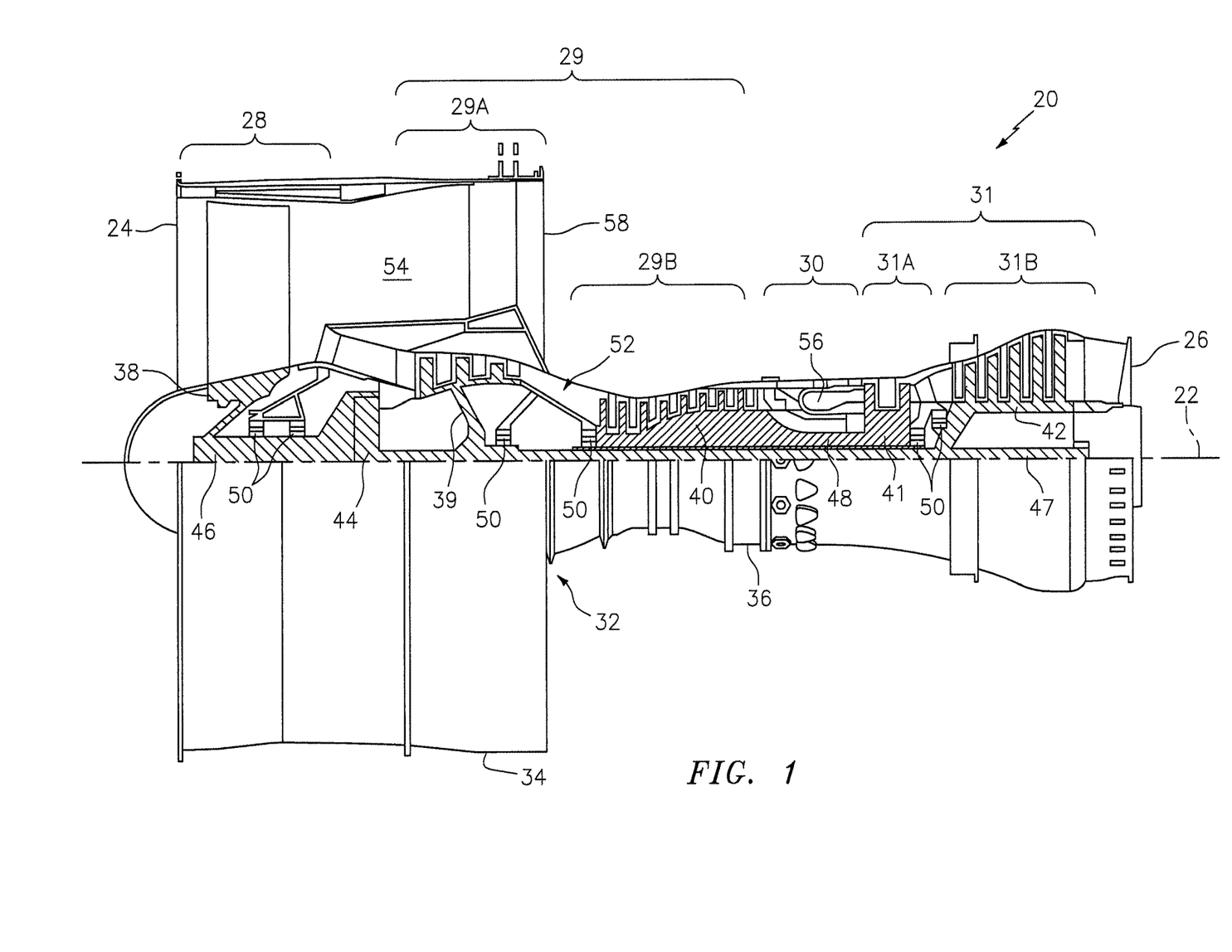
FIG. 1 is a side cutaway illustration of a geared turbine engine.

FIG. 1 is a side cutaway illustration of a geared turbine engine 20. The turbine engine 20 extends along an axial centerline 22 between a forward and upstream airflow inlet 24 and an aft and downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 32, which includes a first engine case 34 and a second engine case 36.

Each of the engine sections 28, 29A, 29B, 31A and 31B includes a respective rotor 38-42. Each of the rotors 38-42 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 38 is connected to a gear train 44 through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50. Each of the bearings 50 is connected to the second engine case 36 by at least one stationary structure such as, for example, an annular support strut.

Air enters the turbine engine 20 through the airflow inlet 24, and is directed through the fan section 28 and into an annular core gas path 52 and an annular bypass gas path 54. The air within the core gas path 52 may be referred to as "core air". The air within the bypass gas path 54 may be referred to as "bypass air".

The core air is directed through the engine sections 29-31 and exits the turbine engine 20 through the airflow exhaust 26. Within the combustor section 30, fuel is injected into a combustion chamber 56 and mixed with the core air. This fuel-core air mixture is ignited to power the turbine engine 20 and provide forward engine thrust. The bypass air is directed through the bypass gas path 54 and out of the turbine engine 20 through a bypass nozzle 58 to provide additional forward engine thrust. Alternatively, the bypass air may be directed out of the turbine engine 20 through a thrust reverser to provide reverse engine thrust.

Figure 2:
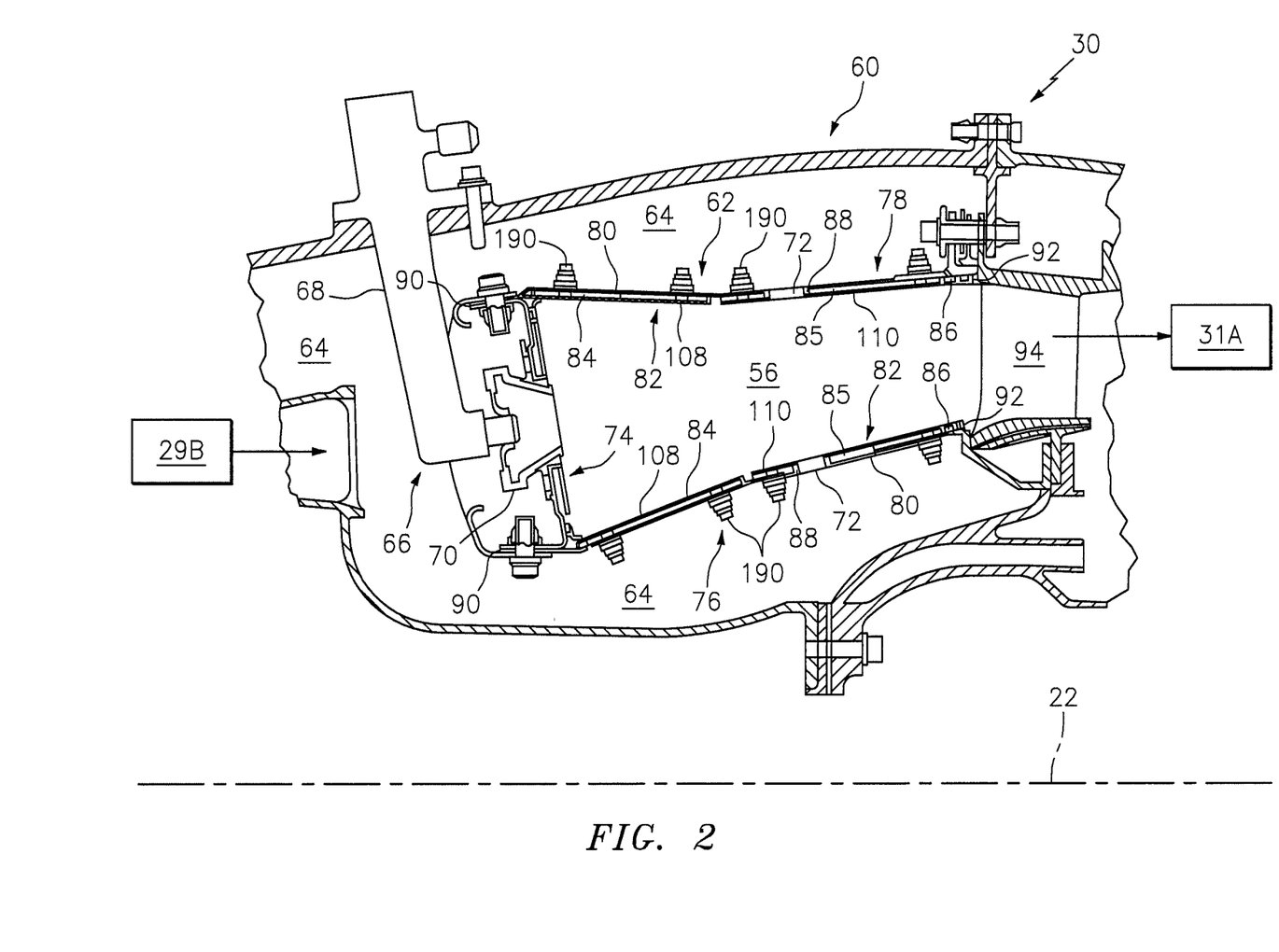
FIG. 2 is a side cutaway illustration of a portion of a combustor section.

FIG. 2 illustrates an assembly 60 of the turbine engine 20. The turbine engine assembly 60 includes a combustor 62 disposed within an annular plenum 64 of the combustor section 30. This plenum 64 receives compressed core air from the HPC section 29B, and provides the received core air to the combustor 62 as described below in further detail.

Figure 3:
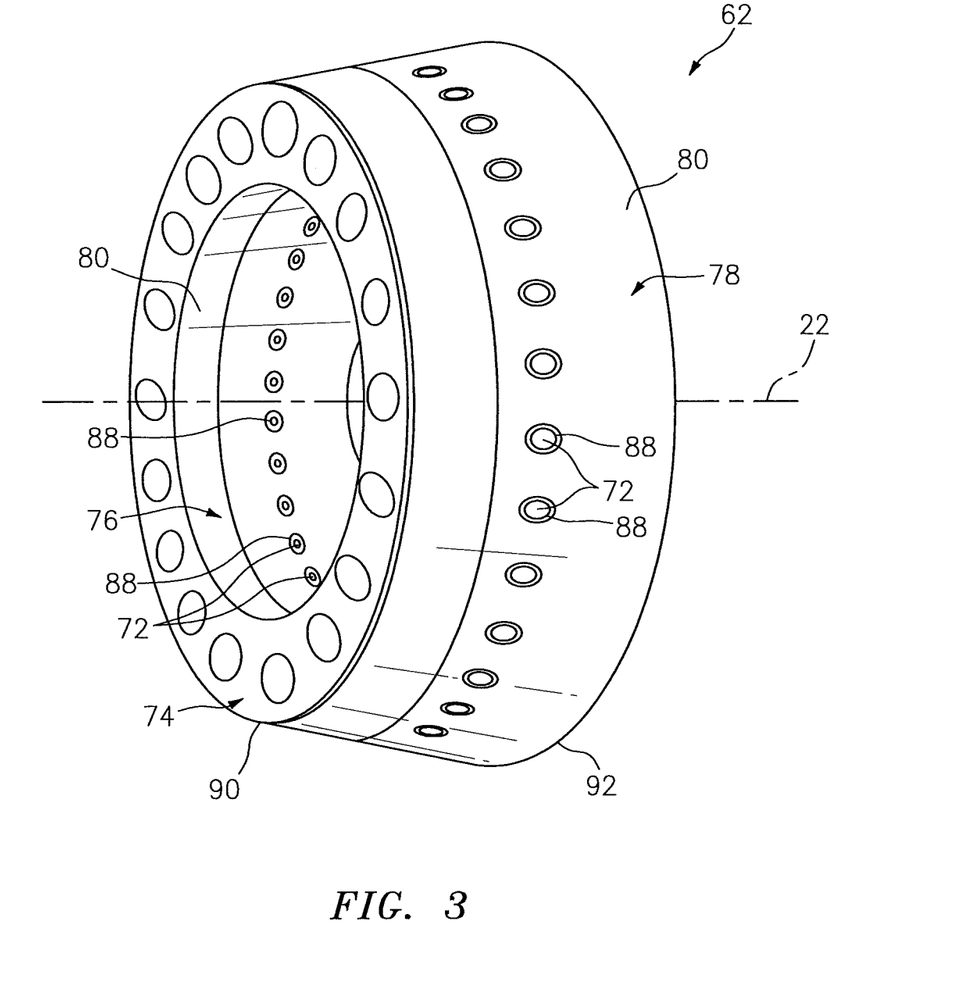
FIG. 3 is a perspective illustration of a portion of a combustor.

The turbine engine assembly 60 also includes one or more fuel injector assemblies 66. Each fuel injector assembly 66 may include a fuel injector 68 mated with a swirler 70. The fuel injector 68 injects the fuel into the combustion chamber 56. The swirler 70 directs some of the core air from the plenum 64 into the combustion chamber 56 in a manner that facilitates mixing the core air with the injected fuel. One or more igniters (not shown) ignite the fuel-core air mixture. Quench apertures 72 (see also FIG. 3) in walls of the combustor 62 direct additional core air into the combustion chamber 56 to quench (e.g., stoichiometrically lean) the ignited fuel-core air mixture.

The combustor 62 may be configured as an annular floating wall combustor. The combustor 62 of FIGS. 2 and 3, for example, includes an annular combustor bulkhead 74, a tubular combustor inner wall 76, and a tubular combustor outer wall 78. The bulkhead 74 extends radially between and is connected to the inner wall 76 and the outer wall 78. The inner wall 76 and the outer wall 78 each extends axially along the centerline 22 from the bulkhead 74 towards the HPT section 31A, thereby defining the combustion chamber 56.

Figure 4:
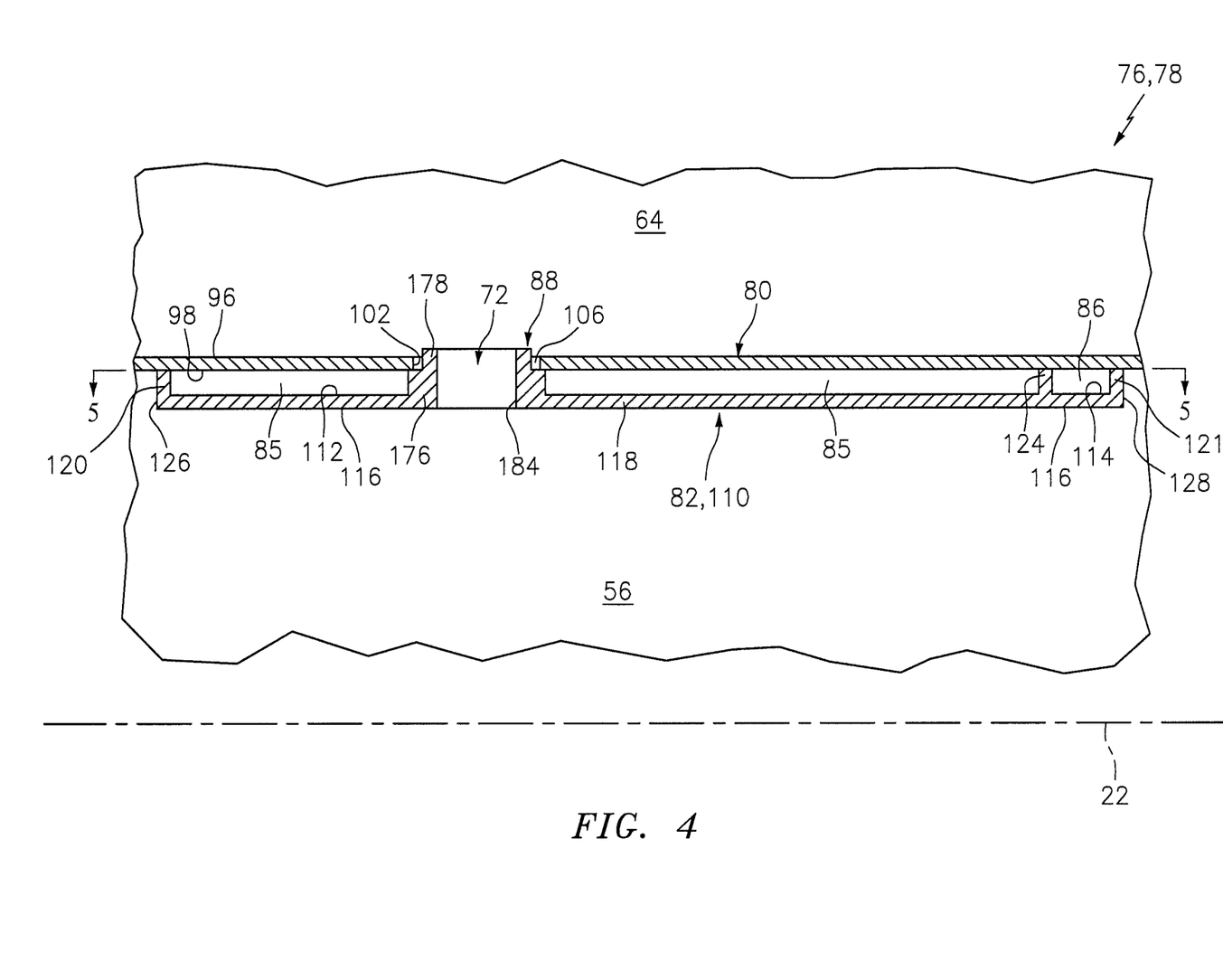
FIG. 4 is a side sectional illustration of a portion of a combustor wall.
Figure 5:
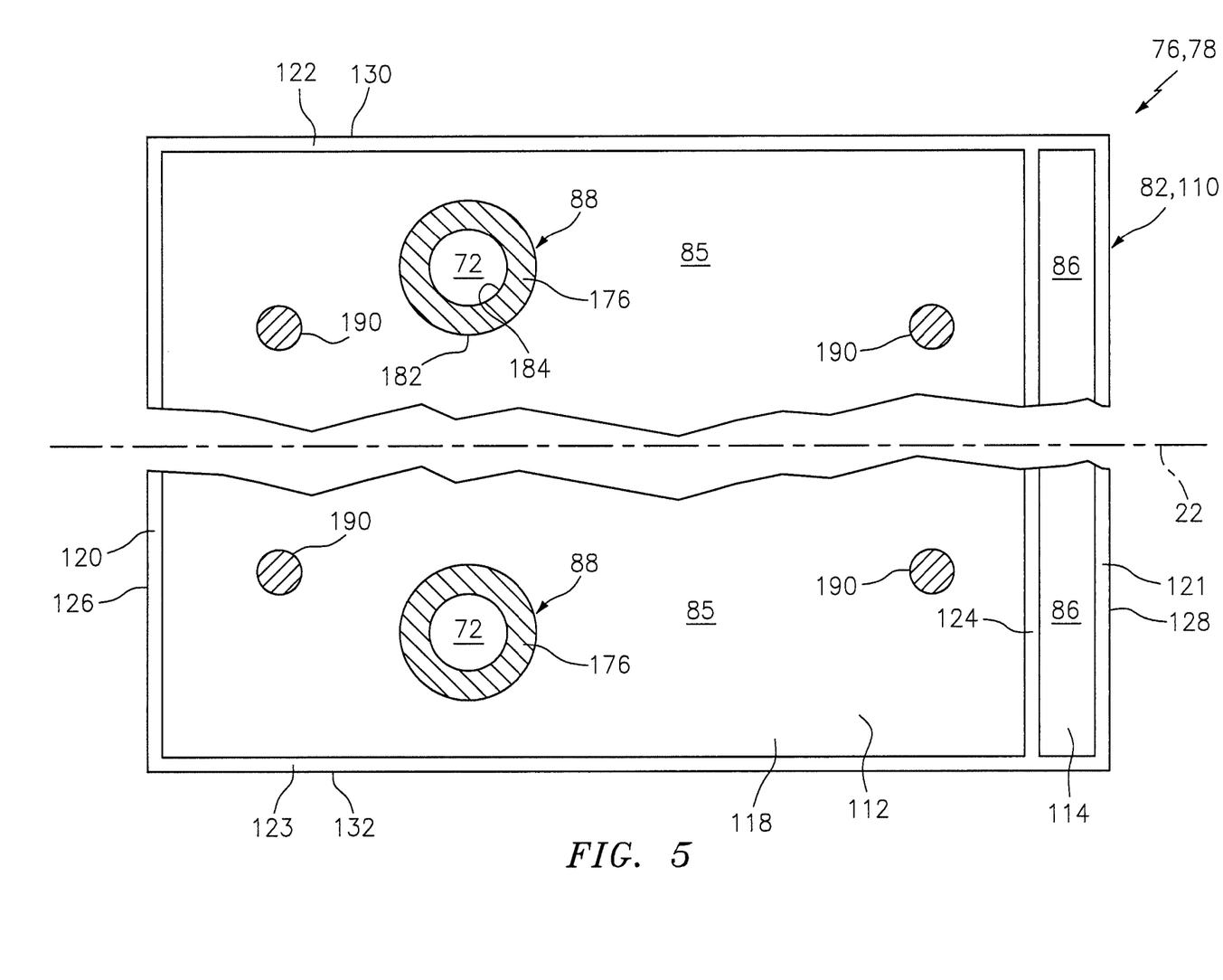
FIG. 5 is a sectional illustration of a portion of the combustor wall of FIG. 4.
Figure 6:
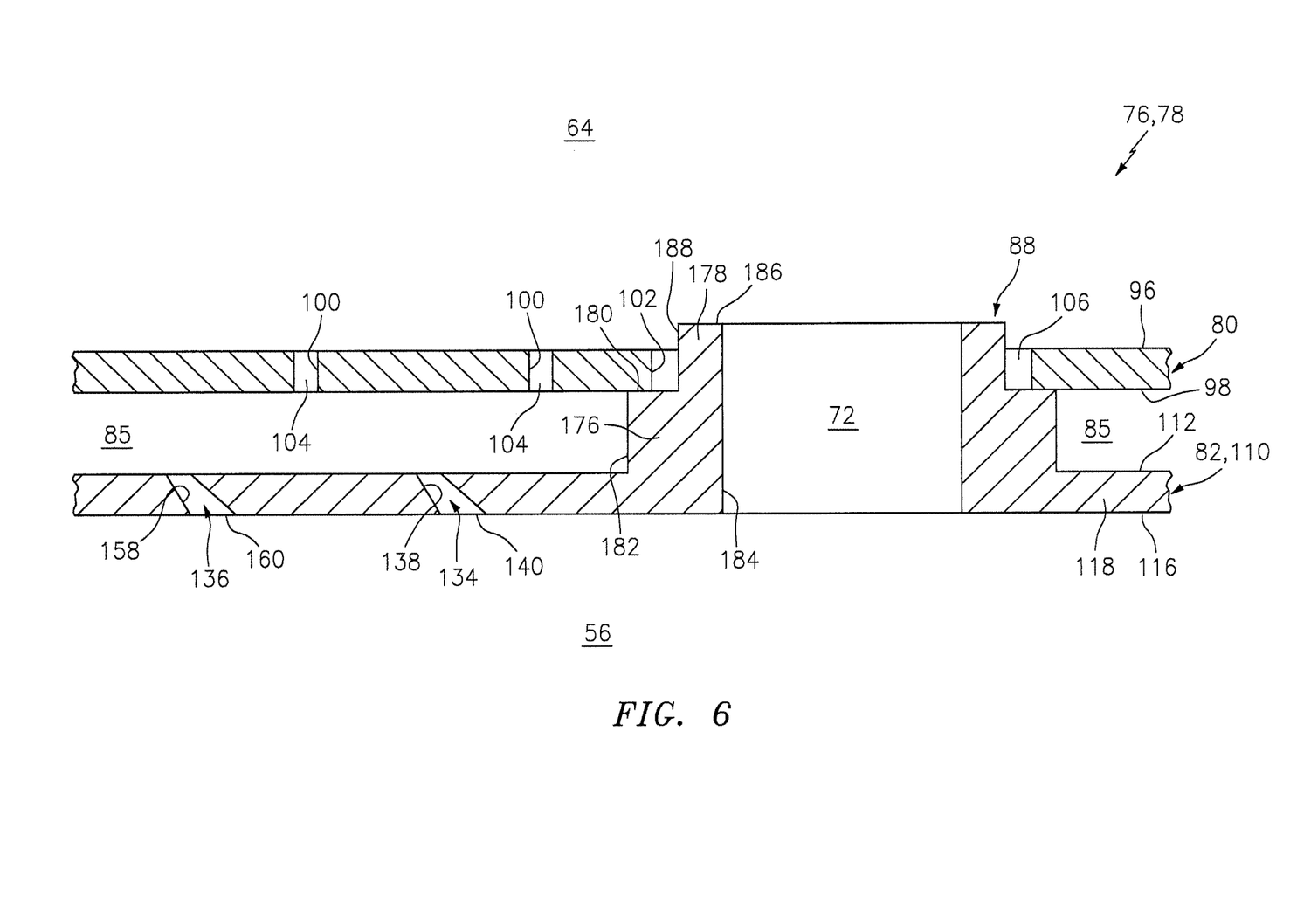
FIG. 6 is a detailed side sectional illustration of a portion of the combustor wall of FIG. 4.
Figure 7:
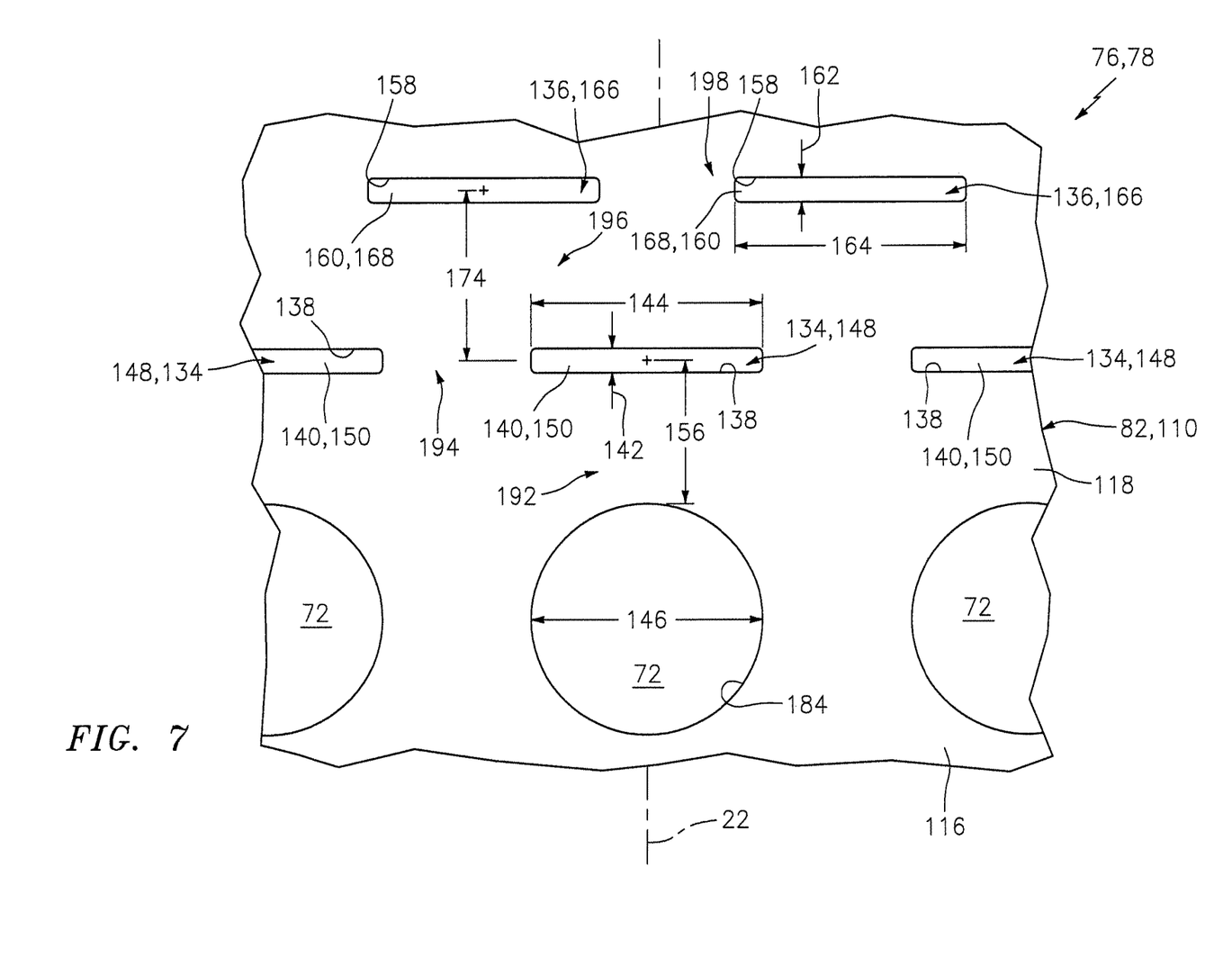
FIG. 7 is a detailed illustration of a portion of the combustor wall of FIG. 6.

FIG. 4 is a side sectional illustration of an exemplary downstream portion of one of the combustor walls 76, 78. FIG. 5 is a circumferential sectional illustration of a portion of the combustor wall 76, 78 of FIG. 4. FIG. 6 is a detailed side sectional illustration of a portion of the combustor wall 76, 78 of FIG. 4. FIG. 7 is a detailed circumferential illustration of a portion of the combustor wall 76, 78 of FIG. 6. It should be noted that some details of the combustor wall 76, 78 shown in FIGS. 6 and 7 are not shown in FIGS. 2, 4 and 5 for ease of illustration.

Referring to FIGS. 2 and 4-7, each combustor wall 76, 78 may each be configured as a multi-walled structure; e.g., a hollow dual-walled structure. Each combustor wall 76, 78 of FIGS. 2 and 4-7, for example, includes a tubular combustor shell 80 and a tubular combustor heat shield 82 with one or more cooling cavities 84-86 (e.g., impingement cavities) between the shell 80 and the heat shield 82. Each combustor wall 76, 78 may also include one or more annular quench aperture bodies 88 (e.g., grommets). These quench aperture bodies 88 are disposed circumferentially around the centerline 22. Each quench aperture body 88 partially or completely defines a respective one of the quench apertures 72 (see also FIG. 3) as described below in further detail.

Referring to FIG. 2, the shell 80 extends circumferentially around the centerline 22. The shell 80 extends axially along the centerline 22 between an axial forward end 90 and an axial aft end 92. The shell 80 is connected to the bulkhead 74 at the forward end 90. The shell 80 may be connected to a stator vane assembly 94 or the HPT section 31A at the aft end 92.

Referring to FIGS. 4 and 6, the shell 80 has an exterior surface 96, an interior surface 98, one or more aperture surfaces 100, and one or more aperture surfaces 102. At least a portion of the shell 80 extend vertically (e.g., radially) between the shell exterior surface 96 and the shell interior surface 98. The shell exterior surface 96, which may also be referred to as a plenum surface, defines a portion of a boundary of the plenum 64. The shell interior surface 98, which may also be referred to as a cavity surface, defines a portion of a boundary of one or more of the cavities 84-86 (see FIG. 2).

Referring to FIG. 6, the aperture surfaces 100 may be arranged in one or more arrays disposed along the centerline 22. The aperture surfaces 100 in each array may be arranged circumferentially around the centerline 22. Each of the aperture surfaces 100 defines a cooling aperture 104. This cooling aperture 104 extends vertically (e.g., radially) through the shell 80 from the shell exterior surface 96 to the shell interior surface 98. The cooling aperture 104 may be configured as an impingement aperture. Each aperture surface 100 of FIG. 6, for example, is configured to direct a jet of cooling air to impinge (e.g., substantially perpendicularly) against the heat shield 82.

The aperture surfaces 102 may be arranged circumferentially around the centerline 22. Each aperture surface 102 defines an aperture 106 for receiving a respective one of the quench aperture bodies 88. Each aperture 106 extends vertically through the shell 80 from the shell exterior surface 96 to the shell interior surface 98.

Referring to FIG. 2, the heat shield 82 extends circumferentially around the centerline 22. The heat shield 82 extends axially along the centerline 22 between an axial forward end and an axial aft end. The forward end is located at (e.g., on, adjacent or proximate) an interface between the combustor wall 76, 78 and the bulkhead 74. The aft end may be located at an interface between the combustor wall 76, 78 and the stator vane assembly 94 or the HPT section 31A.

The heat shield 82 may include one or more heat shield panels 108 and 110, one or more of which may have an arcuate geometry. The panels 108 and 110 are respectively arranged at discrete locations along the centerline 22. The panels 108 are disposed circumferentially around the centerline 22 and form a forward hoop. The panels 110 are disposed circumferentially around the centerline 22 and form an aft hoop. Alternatively, the heat shield 82 may be configured from one or more tubular bodies.

Referring to FIGS. 4 and 5, each of the panels 110 has one or more interior surfaces 112 and 114 and an exterior surface 116. At least a portion of the panel 110 extends vertically between the interior surfaces 112 and 114 and the exterior surface 116. Each interior surface 112, which may also be referred to as a cavity surface, defines a portion of a boundary of a respective one of the cooling cavities 85. Each interior surface 114, which may also be referred to as a cavity surface, defines a portion of a boundary of a respective one of the cooling cavities 86. The exterior surface 116, which may also be referred to as a chamber surface, defines a portion of the combustion chamber 56.

Each panel 110 includes a panel base 118 and one or more panel rails 120-124. The panel base 118 and the panel rails 120 and 122-124 may collectively define the interior surface 112. The panel base 118 and the panel rails 121-124 may collectively define the interior surface 114. The panel base 118 may define the exterior surface 116.

The panel base 118 may be configured as a generally curved (e.g., arcuate) plate. The panel base 118 extends axially between an axial forward end 126 and an axial aft end 128. The panel base 118 extends circumferentially between opposing circumferential ends 130 and 132.

The panel rails may include one or more axial end rails 120 and 121 and one more circumferential end rails 122 and 123. The panel rails may also include at least one axial intermediate rail 124. Each of the panel rails 120-124 of the inner wall 76 extends radially in from the respective panel base 118; see FIG. 2. Each of the panel rails 120-124 of the outer wall 78 extends radially out from the respective panel base 118; see FIG. 2.

The axial end and intermediate rails 120, 121 and 124 extend circumferentially between and are connected to the circumferential end rails 122 and 123. The axial end rail 120 is arranged at (e.g., on, adjacent or proximate) the forward end 126. The axial end rail 121 is arranged at the aft end 128. The axial intermediate rail 124 is disposed axially between the axial end rails 120 and 121, for example, proximate the aft end 128. The circumferential end rail 122 is arranged at the circumferential end 130. The circumferential end rail 123 is arranged at the circumferential end 132.

Referring to FIGS. 6 and 7, each panel 110 may include one or more effusion apertures 134 and one or more effusion apertures 136. These effusion apertures 134 and 136 are defined by the panel base 118 to direct cooling air from the cooling cavity 85 into the combustion chamber 56 to film cool the heat shield 82. Cooling air discharged by one of the effusion apertures 134 and one of the effusion apertures 136, for example, may form an air blanket against the exterior surface 116 that flows along a longitudinal path towards a respective one of the quench apertures 72 as described below in further detail.

Each of the effusion apertures 134 is defined by one or more aperture surfaces 138 of the panel base 118. The effusion apertures 134 may be disposed circumferentially around the centerline 22. Each effusion aperture 134, for example, may be generally laterally (e.g., circumferentially) aligned with a respective one of the quench apertures 72. The effusion apertures 134 are also located longitudinally between the effusion apertures 136 and the quench apertures 72. Each of the effusion apertures 134 extend vertically as well as laterally and/or longitudinally (e.g., axially) through the panel base 118 from an inlet in the interior surfaces 112 to an effusion outlet 140 in the exterior surface 116.

Referring to FIG. 7, the effusion outlet 140 of each effusion aperture 134 may have an elongated cross-section. Each effusion outlet 140, for example, may have a longitudinally extending minor axis and a laterally extending major axis. Examples of such elongated cross-sections include, but are not limited to, an elongated polygonal (e.g., rectangular) cross-section, an oval cross-section, an elliptical cross-section, or any other type of elongated cross-section with a minor axis and a major axis.

Each effusion outlet 140 may have a longitudinal width 142 (e.g., a minor axis width) and a lateral length 144 (e.g., a major axis length). The lateral length 144 may be more than about three times (3×) greater than the longitudinal width 142. The lateral length 144 may also or alternatively be more than about twenty-five percent (25%) of a lateral width 146 (e.g., diameter) of the quench aperture 72. The lateral length 144 of FIG. 7, for example, is more than about fifty percent (50%) of the lateral width 146. The present invention, however, is not limited to the foregoing dimensional relationships.

Referring still to FIG. 7, one or more of the effusion apertures 134 may each be configured as a single cooling slot 148. Each respective effusion outlet 140 therefore may be configured as a single slot outlet 150. With this configuration, the longitudinal width 142 may be measured between opposing longitudinal portions of the aperture surface 138. The lateral length 144 may be measured between opposing lateral portions of the aperture surface 138.

Figure 8:
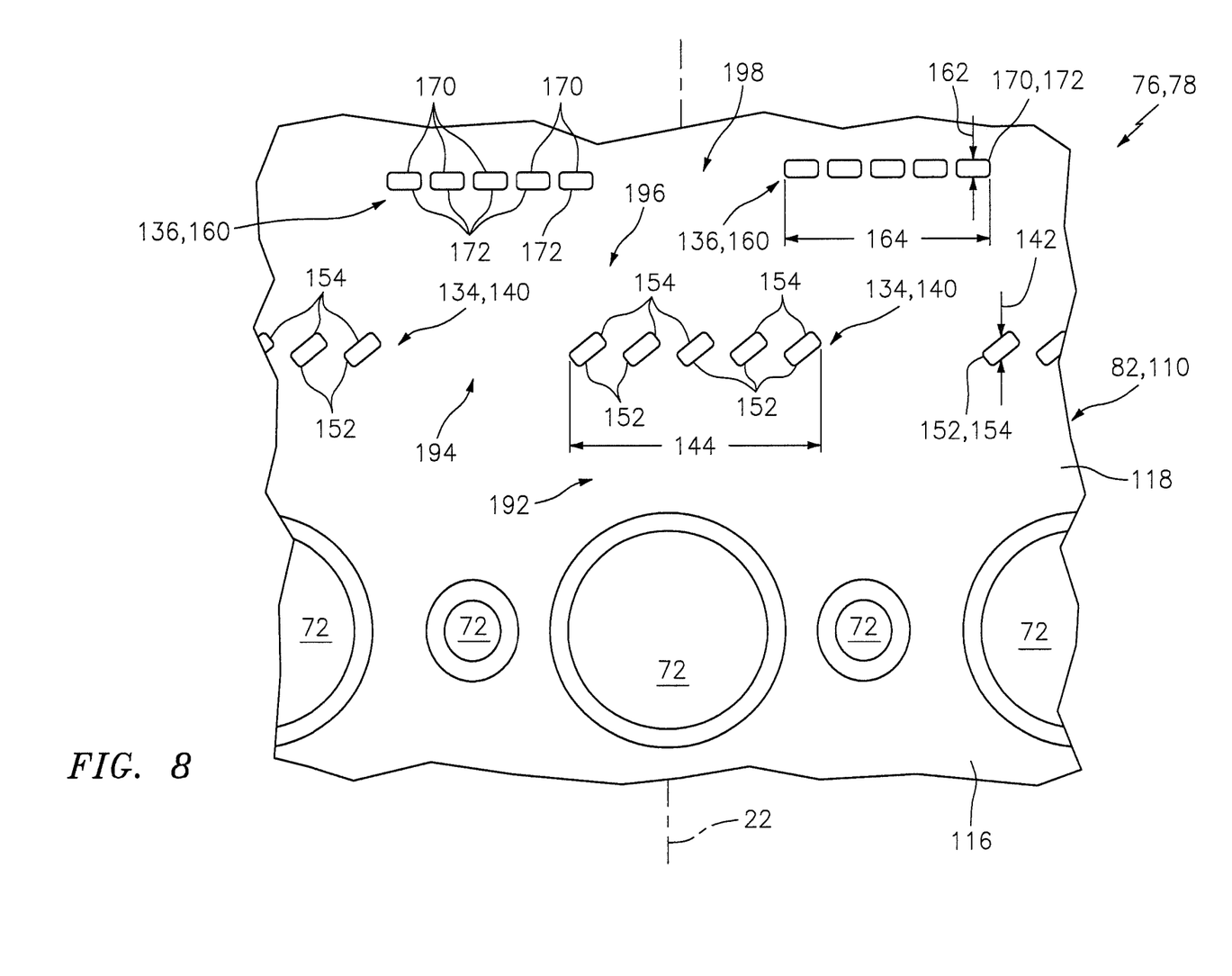
FIGS. 8 and 9 are detailed illustrations of respective portions of alternate embodiment combustor walls.

Alternatively, referring to FIG. 8, one or more of the effusion apertures 134 may each be configured from an array of discrete cooling holes 152, where lateral distances between adjacent holes 152 in a respective array are less than lateral distances between adjacent arrays (e.g., aperture 134). Each respective effusion outlet 140 therefore may be configured from an array of hole outlets 154. With this configuration, the longitudinal width 142 may be measured between opposing longitudinal portions of (e.g., a central)

one of the hole outlets 154; e.g., the longitudinal width is a diameter of the hole outlet 154. The lateral length 144 may be measured between respective opposing lateral portions of the laterally peripheral hole outlets 154.

Referring again to FIGS. 6 and 7, the effusion outlet 140 of each effusion aperture 134 may be located a longitudinal distance 156 from a respective one of the quench apertures 72 with which it is laterally aligned. This longitudinal distance 156 may be equal to between about twenty-five times and about seventy-five times the longitudinal width 142 of the effusion outlet 140. With this geometry, cooling air discharged by the effusion outlet 140 into the combustion chamber 56 may have sufficient space to form at least a portion of the air blanket against the external surface 116 as described below in further detail.

The longitudinal distance 156 may be measured between a lateral centroid of the effusion outlet 140 (e.g., the slot outlet 150 or a central one of the hole outlets 154) and a lateral centroid of an upstream edge of a surface defining a respective one of the quench aperture 72. The longitudinal distance 156 may alternatively correspond to a shortest (e.g., minimum) distance between the effusion outlet 140 and the quench aperture 72.

Each of the effusion apertures 136 is defined by one or more aperture surfaces 158 of the panel base 118. The effusion apertures 136 may be disposed circumferentially around the centerline 22. Each effusion aperture 136 may be laterally offset from (e.g., misaligned with) a respective one of the effusion apertures 134. Each of the effusion apertures 136 extend vertically as well as laterally and/or longitudinally (e.g., axially) through the panel base 118 from an inlet in the interior surfaces 112 to an effusion outlet 160 in the exterior surface 116.

Referring to FIG. 7, the effusion outlet 160 of each effusion aperture 136 may have an elongated cross-section. Each effusion outlet 160, for example, may have a longitudinally extending minor axis and a laterally extending major axis. Examples of such an elongated cross-section include, but are not limited to, an elongated polygonal (e.g., rectangular) cross-section, an oval cross-section, an elliptical cross-section, or any other type of elongated cross-section with a minor axis and a major axis.

Each effusion outlet 160 may have a longitudinal width 162 (e.g., a minor axis width) and a lateral length 164 (e.g., a major axis length). The lateral length 164 may be more than about three times (3×) greater than the longitudinal width 162. The lateral length 164 may also or alternatively be more than about twenty-five percent (25%) of the lateral width 146. The lateral length 164 of FIG. 7, for example, is more than about fifty percent (50%) of the lateral width 146 of the quench aperture 72. The present invention, however, is not limited to the foregoing dimensional relationships.

Referring still to FIG. 7, one or more of the effusion apertures 136 may each be configured as a single cooling slot 166. Each respective effusion outlet 160 therefore may be configured as a single slot outlet 168. With this configuration, the longitudinal width 162 may be measured between opposing longitudinal portions of the aperture surface 158. The lateral length 164 may be measured between opposing lateral portion of the aperture surface 158.

Alternatively, referring to FIG. 8, one or more of the effusion apertures 136 may each be configured from an array of discrete cooling holes 170. Each respective effusion outlet 160 therefore may be configured from an array of hole outlets 172. With this configuration, the longitudinal width 162 may be measured between opposing longitudinal portions of (e.g., a central) one of the hole outlets 172; e.g., the longitudinal width 162 is a diameter of the hole outlet 172. The lateral length 164 may be measured between respective opposing lateral portions of the laterally peripheral hole outlets 172.

Referring again to FIGS. 6 and 7, the effusion outlet 160 of each effusion aperture 136 may be located a longitudinal distance 174 from a respective one of the effusion apertures 134 with which it forms the air blanket. This longitudinal distance 174 may be equal to between about twenty-five times and about seventy-five times the longitudinal width 162 of the effusion outlet 160. With this geometry, cooling air discharged by the effusion outlet 160 into the combustion chamber 56 may have sufficient space to form at least a portion of the air blanket against the external surface 116 as described below in further detail.

The longitudinal distance 174 may be measured between a lateral centroid of the effusion outlet 160 (e.g., the slot outlet or a central one of the hole outlets) and the lateral centroid of the respective effusion outlet 140. The longitudinal distance 174 may alternatively correspond to a shortest (e.g., minimum) distance between the effusion outlet 160 and the respective effusion outlet 140.

Referring to FIGS. 4-6, each of the quench aperture bodies 88 is formed integral with (or attached to) a respective one of the panel bases 118. One or more of the quench aperture bodies 88 are located laterally within and extend vertically through a respective one of the cooling cavities 85. One or more of the quench aperture bodies 88, for example, may be arranged circumferentially between the circumferential end rails 122 and 123 of a respective one of the panels 110. One or more of the quench aperture bodies 88 may be arranged axially between the axial end and intermediate rails 120 and 124 of a respective one of the panels 110.

Referring to FIG. 6, each quench aperture body 88 may include an annular land 176 and an annular rim 178. The land 176 is connected to the respective panel base 118. The land 176 extends vertically from the panel base 118 to a distal land end surface 180. The land 176 extends laterally between a land outer surface 182 and a body inner surface 184, which at least partially defines a respective one of the quench apertures 72 in the combustor wall 76, 78. The body inner surface 184, for example, defines a through-hole that extends vertically through the panel 110 from a distal rim end surface 186 to the exterior surface 116.

The rim 178 is connected to the land 176. The rim 178 extends vertically from the land 176 and the land end surface 180 to the rim end surface 186. The rim 178 extends laterally between a rim outer surface 188 and the body inner surface 184.

Referring to FIG. 2, the heat shield 82 of the inner wall 76 circumscribes the shell 80 of the inner wall 76, and defines an inner side of the combustion chamber 56. The heat shield 82 of the outer wall 78 is arranged radially within the shell 80 of the outer wall 78, and defines an outer side of the combustion chamber 56 that is opposite the inner side.

Referring now to FIG. 6, each quench aperture body 88 is (e.g., axially and circumferentially) aligned and mated with a respective one of the apertures 106. Each rim 178, for example, extends vertically through (or into) a respective one of the apertures 106. Each land end surface 180 may engage (e.g., slidably contact) and form a seal with the shell interior surface 98 and, thus, the shell 80.

Referring to FIG. 2, the heat shield 82 and, more particularly, each of the panels 108 and 110 may be respectively attached to the shell 80 by a plurality of mechanical attachments 190; e.g., threaded studs respectively mated with washers and nuts. The shell 80 and the heat shield 82 thereby respectively form the cooling cavities 84-86 in each combustor wall 76, 78.

Referring to FIGS. 4-6, each cooling cavity 85 is defined and extends vertically between the interior surface 98 and a respective one of the interior surfaces 112 as set forth above. Each cooling cavity 85 is defined and extends circumferentially between the circumferential end rails 122 and 123 of a respective one of the panels 110. Each cooling cavity 85 is defined and extends axially between the axial end and intermediate rails 120 and 124 of a respective one of the panels 110. In this manner, each cooling cavity 85 may fluidly couple one or more of the cooling apertures 104 in the shell 80 with one or more of the effusion apertures 134 and 136 in the heat shield 82.

During turbine engine operation, core air from the plenum 64 is directed into each cooling cavity 85 through respective cooling apertures 104. This core air (e.g., cooling air) may impinge against the respective panel base 118, thereby impingement cooling the panel 110 and the heat shield 82. The cooling air within each cooling cavity 85 is subsequently directed through the effusion apertures 134 and 136 into the combustion chamber 56 to film cool a downstream portion of the heat shield 82. Within each effusion aperture 134, 136, the cooling air may also cool the heat shield 82 through convective heat transfer.

As set forth above, the cooling air discharged from the effusion apertures 134 and 136 may form air blankets against the exterior surface 116 that flow along respective longitudinal paths towards the quench apertures 72. These air blankets may provide thermal barriers between portions of the heat shield 82 adjacent the quench apertures 72 and the relatively hot core air within the combustion chamber 56. The air blankets may also or alternatively convectively cool the respective portions of the heat shield 82.

It is worth noting that increasing the longitudinal distances 156 and/or 174 may result in the cooling air detaching from the exterior surface 116 before cooling the portions of the heat shield 82 adjacent the quench apertures 72. Conversely, decreasing the longitudinal distances 156 and/or 174 may not provide enough space for the cooling air to form the air blankets, which may allow secondary horseshoe vortices in the core air to reach and thermally degrade the heat shield 82. In addition, by superimposing the effusion outlets 140 with the effusion outlets 160, the cross-sectional area of the effusion outlets 140 may be decreased and less core air may be siphoned away from the plenum 64 and directed into the combustion chamber 56 for cooling purposes. This in turn may increase turbine engine efficiency as well as reduce turbine engine emissions.

In some embodiments, referring to FIGS. 7 and 8, a portion 192 of the heat shield 82 extending between each effusion outlet 140 and the respective quench aperture 72 may be non-perforated. A portion 194 of the heat shield 82 extending between respective effusion outlets 140 may also or alternatively be non-perforated. A portion 196 of the heat shield 82 between adjacent effusion apertures 140 and 160 may also or alternatively be non-perforated. A portion 198 of the heat shield 82 between adjacent effusion apertures 160 may also or alternatively be non-perforated.

Figure 9:
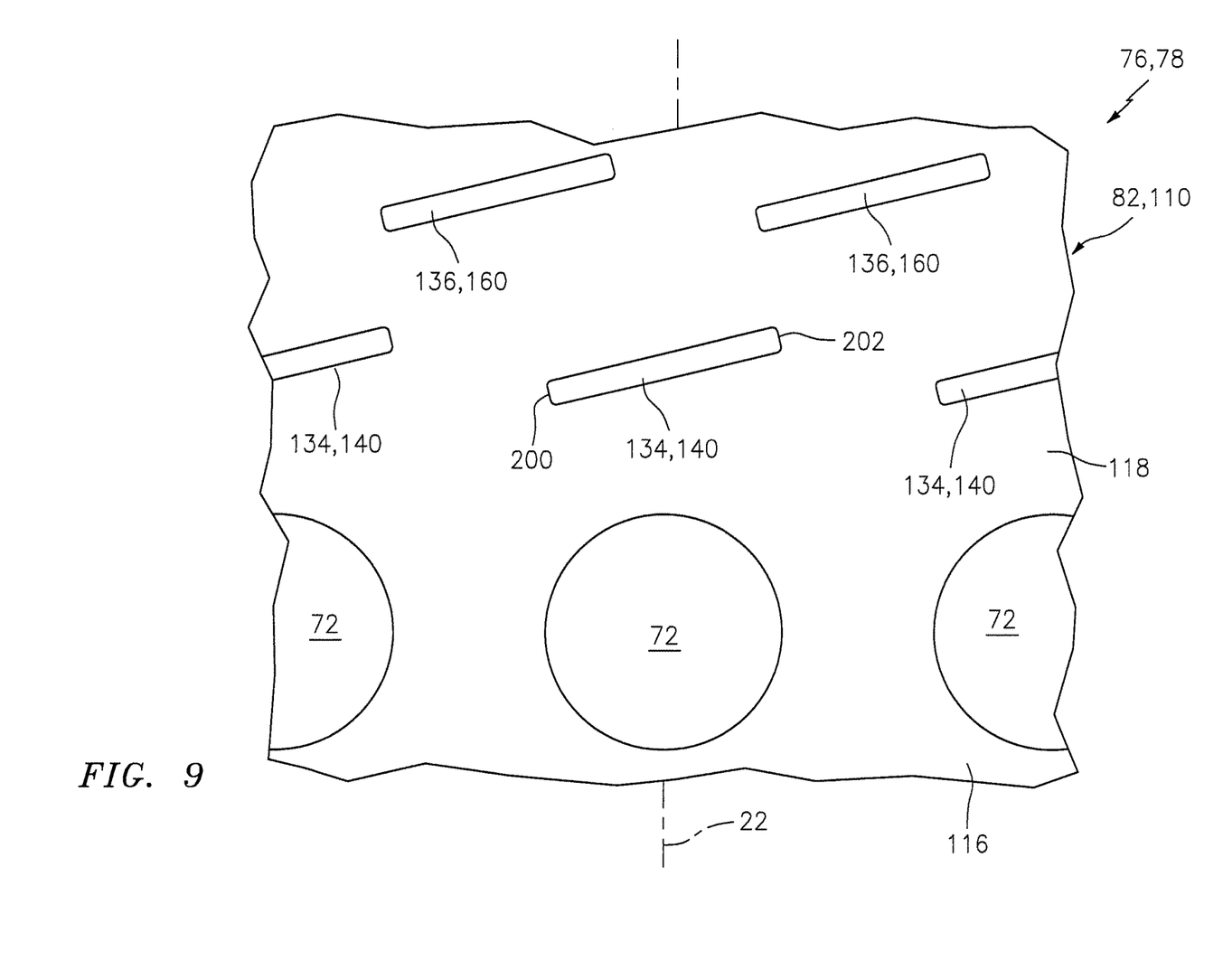

In some embodiments, referring to FIG. 9, one or more of the effusion outlets 140 and/or 160 may be longitudinally skewed. Each effusion outlet 140, for example, may extend laterally between opposing ends 200 and 202. The effusion outlet end 200 may be positioned longitudinally closer to a respective one of the quench apertures 72 than the effusion outlet end 202.

Figure 10:
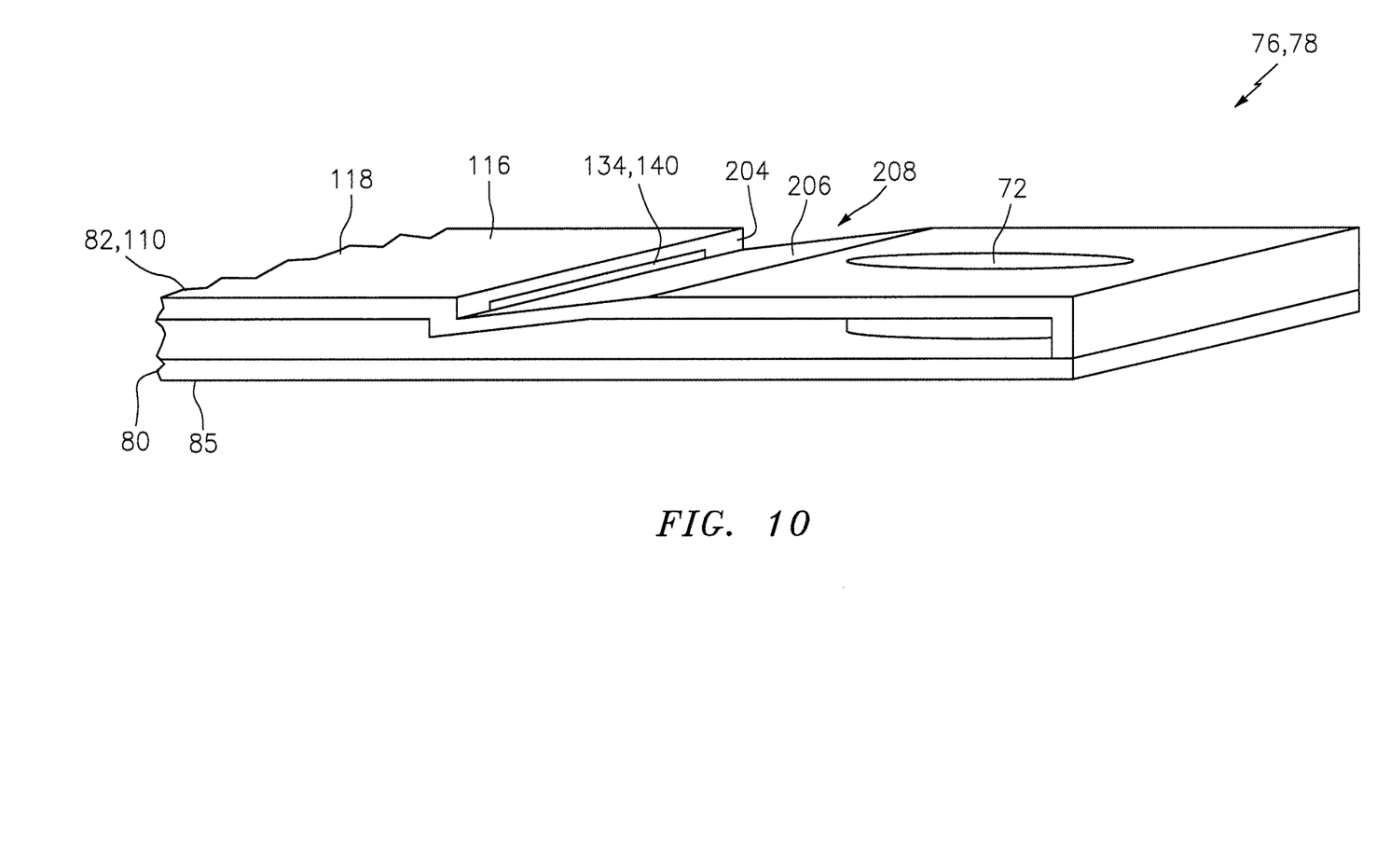
FIGS. 10 and 11 are perspective illustrations of respective portions of alternate embodiment combustor walls.
Figure 11:
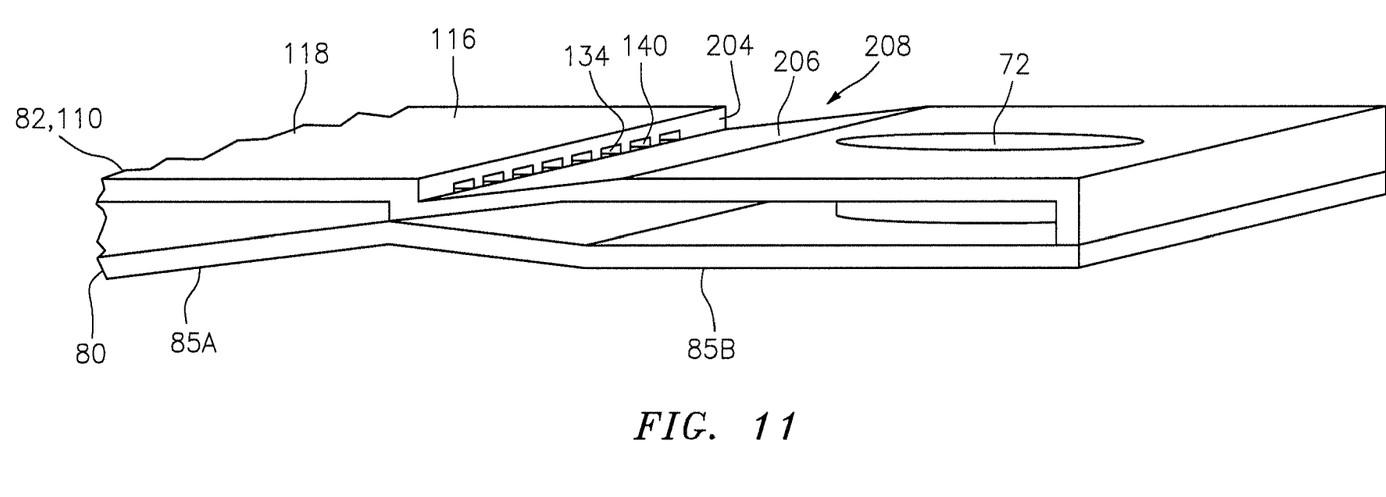

In some embodiments, referring to FIGS. 10 and 11, one or more of the effusion outlets 140 (and/or 160) may be vertically recessed from the exterior surface 116. Each panel base 118, for example, may include one or more surfaces 204 and 206 that form a laterally extending recess 208 in the panel 110. Each effusion outlet 140 may be defined at an intersection between the recess surfaces 204 and 206. Alternatively, each effusion outlet 140 may be disposed in one of the recess surfaces 204 or 206. Such a recess 208 may promote adhesion of the cooling air discharged from the effusion outlet 140 against the heat shield 82. In addition, referring to FIG. 11, the panel base 118 may be configured to sub-divide the cooling cavity 85 into separate cooling cavities 85A and 85B. The panel base 118 of FIG. 11, for example, vertically engages the shell 80 proximate the recess 208.

In some embodiments, referring to FIGS. 6 and 7, each of the surfaces 102, 182, 184 and 188 may have a circular cross-section. In other embodiments, however, one or more of the surfaces 102, 182, 184 and 188 may each have a non-circular cross-section. Examples of a non-circular cross-section include, but are not limited to, an oval cross-section, an elliptical cross-section, a pear-shaped cross-section, a teardrop cross-section, a polygonal (e.g., rectangular) cross-section, or any other symmetric or asymmetric shaped cross-section with, for example, its major axis aligned (e.g., parallel) with the centerline 22.

The terms "forward", "aft", "inner", "outer", "radial", "circumferential" and "axial" are used to orientate the components of the turbine engine assembly 60 and the combustor 62 described above relative to the turbine engine 20 and its centerline 22. One or more of these turbine engine components, however, may be utilized in other orientations than those described above. The present invention therefore is not limited to any particular spatial orientations.

The turbine engine assembly 60 may be included in various turbine engines other than the one described above. The turbine engine assembly 60, for example, may be included in a geared turbine engine where a gear train connects one or more shafts to one or more rotors in a fan section, a compressor section and/or any other engine section. Alternatively, the turbine engine assembly 60 may be included in a turbine engine configured without a gear train. The turbine engine assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, the assembly comprising:

a combustor wall extending circumferentially around and axially along an axial centerline of the turbine engine;

the combustor wall including a shell and a heat shield and defining a quench aperture vertically through the shell and the heat shield, the heat shield defining a slot outlet through which air effuses and forms an air blanket against the heat shield that flows along a longitudinal path towards the quench aperture;

wherein the slot outlet has an axially extending minor axis and a circumferentially extending major axis;

wherein the quench aperture has a lateral width; and wherein the circumferentially extending major axis is greater than twenty-five percent of the lateral width.

2. The assembly of claim 1, wherein a longitudinal distance from the slot outlet to the quench aperture is equal to between about twenty-five times and about seventy-five times a longitudinal width of the slot outlet; and a portion of the heat shield extending along the longitudinal path from the slot to the quench aperture is non-perforated.

3. The assembly of claim 2, wherein the longitudinal distance is measured between a lateral centroid of the slot outlet and a lateral centroid of an upstream edge of a surface defining the quench aperture in the heat shield.

4. The assembly of claim 2, wherein the longitudinal distance is a shortest distance between the slot outlet and the quench aperture.

5. The assembly of claim 1, wherein a portion of the heat shield extending between the slot outlet and the quench aperture is non-perforated.

6. The assembly of claim 1, wherein the heat shield further defines a second slot outlet with the slot outlet longitudinally between the second slot outlet and the quench aperture.

7. The assembly of claim 6, wherein the second slot outlet is laterally offset from the slot outlet.

8. The assembly of claim 6, wherein a distance from the second slot outlet to the slot outlet is equal to between about twenty-five and about seventy-five times a width of the second slot outlet.

9. The assembly of claim 6, wherein a portion of the heat shield extending between the second slot outlet and the slot outlet is non-perforated.

10. The assembly of claim 1, wherein the slot outlet is recessed from a surface of the heat shield opposite a cooling cavity defined between the shell and the heat shield.

* * * * *